Nov. 26, 1963    W. T. GRAY    3,111,841
MOTOR TESTING APPARATUS
Filed July 22, 1959    2 Sheets-Sheet 1
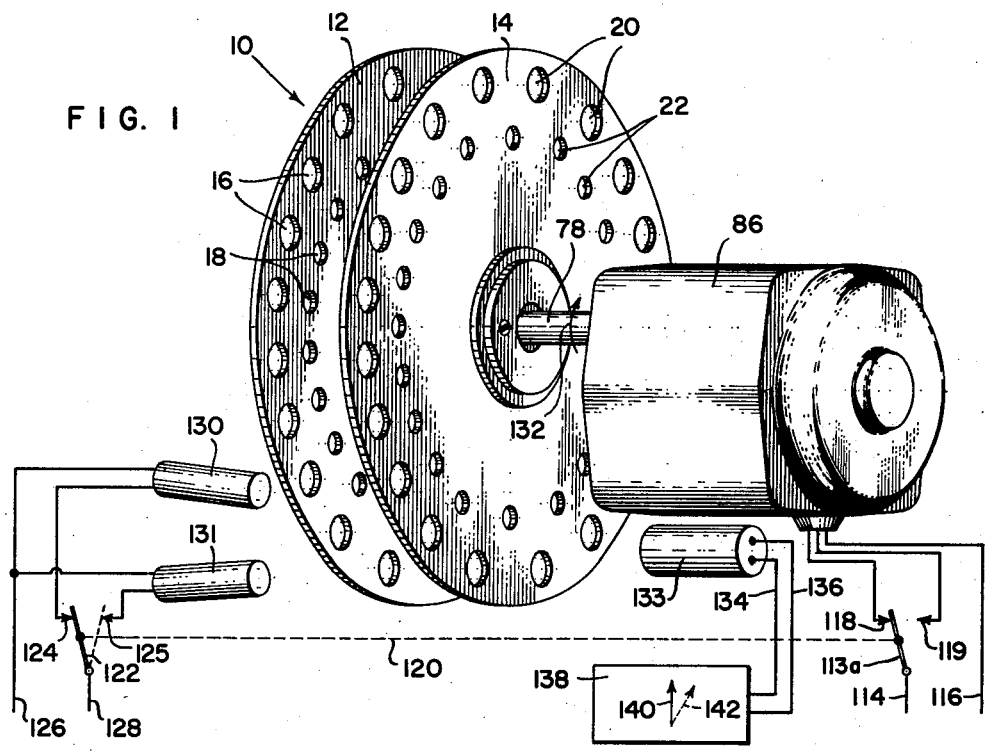
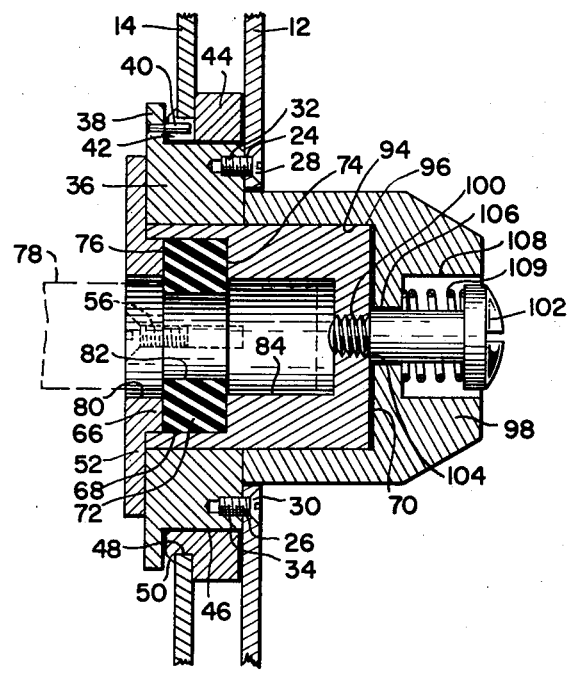
INVENTOR.
WILLIAM T. GRAY
BY
ATTORNEY.

Nov. 26, 1963 W. T. GRAY 3,111,841
MOTOR TESTING APPARATUS
Filed July 22, 1959 2 Sheets-Sheet 2
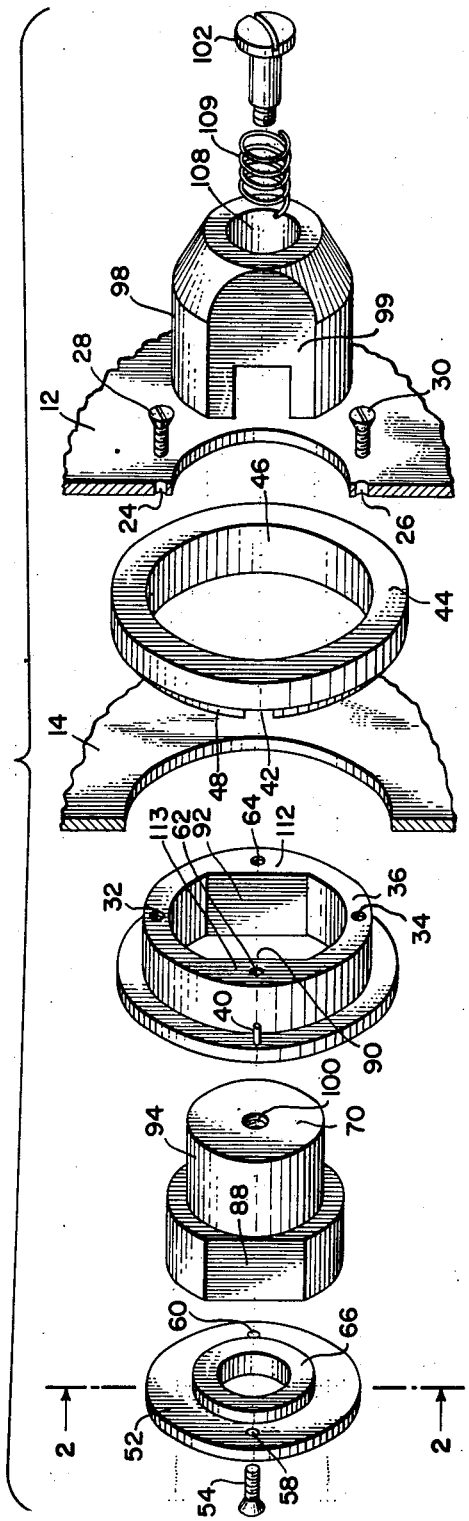
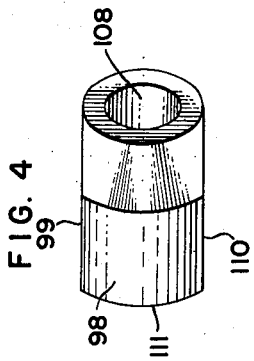
INVENTOR.
WILLIAM T. GRAY
BY
ATTORNEY.

United States Patent Office 3,111,841
Patented Nov. 26, 1963

3,111,841
MOTOR TESTING APPARATUS
William T. Gray, Media, Pa., assignor to Minneapolis-Honeywell Regulator Company, Minneapolis, Minn., a corporation of Delaware
Filed July 22, 1959, Ser. No. 828,850
13 Claims. (Cl. 73—116)

The object of the present invention is to provide a measuring apparatus which will indicate whether the armature and field connections of an electric motor have been properly assembled in order to provide the desired clockwise and counter-clockwise rotation of its motor shaft when the terminals of the motor are connected to an electric power supply in a prescribed manner.

It is still another object of the present invention to provide a motor tester of the aforementioned type in which apertures in a first disc that is fixedly connected to the motor shaft are automatically aligned with apertures in a second disc which is loosely mounted for partial movement on the motor shaft only when the armature and field connections of the motor have been correctly assembled in a prescribed manner. The disc arrangement being such that light from a light source is permitted to pass through these aligned apertures and onto a light responsive indicator to thereby indicate that the motor is rotating in the correct clockwise and/or counter-clockwise manner when the motor is connected in a prescribed manner to an electric power source.

It is still another object of the present invention to provide a motor tester of the aforementioned type in which the two discs that are mounted on the motor shaft are arranged to prevent light from a light source from passing through the apertures in the discs and onto a light responsive member to thereby indicate that the motor is rotating in an undesired clockwise or counter-clockwise direction when the armature and field connections have been improperly assembled and the motor has been connected in a prescribed manner to an electric power source.

It is still another more specific object of the invention to provide a pin and slot connection between the aforementioned discs that are respectively fixedly and loosely mounted on the motor shaft so as to provide a means whereby light from a light source can be transmitted successively through sets of aligned apertures in the discs onto a light responsive indicating means when the armature and field connections of the motor have been properly assembled and the motor shaft is connected to a power source to rotate it in a prescribed clockwise direction or which will prevent this light from being transmitted through the apertures in the discs and onto the light responsive indicating means whenever the armature and field connections have been improperly assembled and the motor shaft is thus caused to be rotated in a non-prescribed direction when the connection is made between the power source and said motor.

It is still another specific object of the invention to provide a pin and slot connection between two discs that are respectively fixedly and loosely mounted on the motor shaft so as to provide a means whereby light from a light source can be transmitted successively through other sets of aligned apertures in the two discs onto a light responsive indicating means when the armature and field connections of the motor have been properly assembled and the motor shaft is connected to a power source to rotate it in a prescribed counter-clockwise direction or which will prevent this light from being transmitted through the apertures in the discs and onto the light responsive indicating means whenever the armature and field connections have been improperly assembled and the motor shaft is thus caused to be rotated in a non-prescribed direction when the connection is made between the power source and said motor.

Another object of the present invention is to provide two stroboscopic discs which when rotated by an electric motor under test will permit light from a light source to be pulsed in a prescribed stroboscopic manner onto a light responsive indicating means when the motor has been wired correctly and is rotating in a desired pre-selected direction and which rotating discs are arranged to cut off light from being transmitted to the light indicating means when the motor has been wired in an incorrect manner.

Another object of the invention is to provide a switching unit for the aforementioned motor testing apparatus which when closed in one direction will cause a first light source to cast a light against a first outer circumferential portion of one of said discs and the motor under test to be simultaneously rotated in one direction and which switching unit when closed in another direction will cause a second light source to cast a light against an inner circumferential portion of one of said discs and the motor under test to be simultaneously rotated in the opposite direction.

In the drawings:

FIGURE 1 shows a general arrangement of the motor testing apparatus;

FIGURE 2 shows a cross section of the motor testing apparatus in a locked position;

FIGURE 3 shows an exploded view of the motor testing apparatus in an unlocked position and FIGURE 4 shows the position to which a part of the apparatus shown in FIGURE 3 may be rotated to place it in a locked position.

In FIGURE 1 of the drawing there is shown a motor testing apparatus which is generally designated as reference numeral 10. This apparatus is comprised of a first and second stroboscopic disc 12, 14. The disc 12 is shown having a plurality of large and small radially aligned apertures 16, 18 equally spaced in a radial and circumferential manner about the entire outer flat surface of the disc 12.

The disc 14 is also shown having large and small apertures 20, 22 which are of the same corresponding size as the apertures 16 and 18 in disc 12.

Although the centers of each of the associated pairs of small and large apertures 20, 22 are equally spaced from one another in a circumferential manner along the entire flat surface of the disc, the smaller of these apertures 22 have their centers located on a radial line that is formed by bisecting the line passing through the centers of any two immediately adjacent large apertures 20. In other words the smaller apertures are not radially aligned with their associated larger apertures as are the smaller apertures 18 in the disc 12 but are rather located on an inner circumferential bore diameter having radial center lines which are located in a staggered manner on radial lines which extend at equal angles between each successive pair of large apertures.

As can best be seen in FIGURES 2 and 3 the inner circumferential portion of the disc 12 has two counterbored holes 24, 26 therein to accommodate two flat head machine screws 28, 30. These machine screws 28, 30 pass through their associated holes 24 or 26 in disc 12 and are respectively threadedly connected by way of the tapped holes 32, 34 to a collar 36 which forms an inner hub portion of the disc 12. The left end of this collar 36 has a flat circumferential portion 38 which portion has a fixedly mounted pin 40 protruding therefrom. The right end of this pin 40 is shown protruding for movement within a slot 42 of a ring-shaped member 44 which is shown as being approximately three pin diameters long. This ring-shaped member 44 has an inner diametral portion 46 that is slidably mounted on the outer right end peripheral surface of the collar 36. The left side of this ring-shaped member 44 is shown having an outer peripheral surface 48 which is smaller than the peripheral surface forming the right end of the member 44. The disc 14 is mounted on the surface 48 in a force-fit manner and retained against longitudinal movement on this surface by staking the portion 50 of the member 44 against the left inner end of the disc 14.

The left surface of the flat circumferential portion 38 of the collar 36 is held in surface to surface contact with an end plate 52 by means of flat head machine screws for example screws 54, 56 which respectively pass through countersunk holes 58, 60 in the plate 52 and into threaded engagement with the tapped holes 62, 64 in the collar 36.

The right end portion of the retaining plate 52 has an embossed portion 66 which fits into a bored out aperture formed by the left inner wall 68 of the coupling member 70. When the embossed portion 66 is in its assembled position as shown in FIGURE 2 of the drawing the cylindrical rubber bushing insert 72 will be in a slightly compressed position between the right face of the embossed portion 66 and the inner wall 74 of the coupling member 70. The inner surface 76 of the rubber bushing 72 is arranged in the aforementioned manner in order to maintain the bushing 72 and the elements 52, 70 in a fixed position on a rotary motor shaft 78 when the bushing is brought into contact with same. This connection is accomplished by moving the walls 80, 82, and 84 that form cylindrical apertures into a position as shown in FIGURE 1 and FIGURE 2 of the drawing so that they surround the entire peripheral portion of the end part of the motor shaft 78 of the motor 86.

The outer peripheral portion of the coupling member 70 has two flat surfaces, namely a first flat surface 88 shown in FIGURE 3 of the drawing which when assembled is positioned adjacent the left end of the flat surface 90 forming an inner wall portion of the collar 36.

A second flat surface not shown, which is identical and directly opposite to that of the first flat surface of this coupling 70 when assembled with the collar 36 will be in a position that is adjacent the left end of the flat surface 92 which forms another inner wall portion of this collar 36.

When the motor tester is assembled in a locked position as shown for the parts in FIGURES 2 and 4 of the drawing the outer cylindrical surface 94 of the coupling 70 will be retained within the hollow cavity formed by the inner wall surface 96 of the disc retaining plate 98. In the center of the extreme right end of the coupling 70 there is shown a tapped hole 100 into which the left end of a cap screw 102 is threadedly engaged. At the lower end of the cap screw 102 immediately above its threaded portion there is shown a shoulder 104 that engages the right end of the coupling member 70. A retaining plate 98 is provided with two cylindrical apertures of different diameters formed by the surfaces 106, 108 for accommodating the upper shank portion of the cap screw 102.

The construction is such that the spring maintains the retaining plate 98 in a compressed state against the right side of collar 36 to enable the rubber bushing 72, end plate 52, coupling 70, cap screw 102, spring 109, retaining plate 98, collar 36 and the disc 12 fixedly attached thereto to rotate as a unitary mass when these elements are mounted by way of the rubber bushing on the motor shaft 78 and the motor 86 is energized. This arrangement also provides an easy way of disassembly of the aforementioned parts after the motor has been rotated through a clockwise and/or counter-clockwise rotary test which will now be described.

It should be understood that different apertures other than the ones shown may be formed by the wall surfaces 80, 82, 84 and that the longitudinal length of the surface formed by the wall 84 can be changed to suit various sizes of motor shafts to be tested with this apparatus other than the size of the shaft 78 shown in the drawing.

In order that the retaining plate 98 can be readily removed and reused when a rotary test of one size motor shaft has been completed and another size motor shaft is to commence this plate 98 is arranged to be rotated in either a 90° clockwise or a 90° counter-clockwise direction from the locked position that is disclosed in FIGURE 4 to an unlocked position which is shown in FIGURE 3.

When the retaining plate 98 is ready to be reused with a new size motor shaft it is placed in the locked position shown in FIGURE 4. It can readily be seen that when the retaining plate 98 has been shifted between the unlocked position shown in FIGURE 3 to the locked position shown in FIGURE 4 that the flat surfaces 99, 110 forming its outer peripheral surface prevent the retaining plate 98 from being slid through the aperture formed by the flat surfaces of the walls 90, 92 of the collar 36 because the rear left end surface 111 of the plate 98 will then be in surface-to-surface contact with the surfaces 112 and 113 of the collar 36. Such an arrangement provides a means by which the retaining plate 98 can readily be removed from for example the apparatus shown in the drawing and thence be used to test another different length and/or diameter motor shaft which requires other parts having inside diameters of their apertures formed by walls 80, 82, and 84 of different size than that shown in the drawing.

After the parts have been assembled on the motor shaft 78 in either of the aforementioned locked positions the motor switch 113a, which is operably connected to a pair of electrical conductors 114, 116 that are supplying electric power to the motor 86, is switched into engagement with contact 118 of the double throw switch 113a having single contacts 118, 119 as shown in FIGURE 1.

While the motor switch 113a is being moved to this position a mechanical connection 120 between this switch 113a and the light switch 122 will also simultaneously take place. The switch 122 is shown connected in this condition by switch contact 124 of the double throw switch 122 having single contacts 124, 125 to a pair of conductors 126, 128 whose lowermost ends are in turn connected to a power supply not shown.

When the motor testing apparatus is switched into this contact position current will be supplied from the power source to rotate the motor 86 in one rotary direction and simultaneously cause the photo tube excitor lamp 130 to be energized. This will permit the excitor lamp 130 to focus its light on a circumferential portion of the disc 12 on which the smaller apertures 18 are located. If the field and armature connections of the motor have been correctly wired the direction of rotation of the motor shaft 78 will be such as to drive the rubber bushing 72, the embossed portion 66, the end plate 52, coupling member 70, retaining plate 98, shoulder 104, collar 36, disc 12 and the pin 40 attached to the flange 36 in a rotary manner as a unitary mass. Since the associated inner apertures 22 on the disc 14 are displaced from the apertures 18 on disc 12 no light will be initially permitted to pass through the second disc 14 before the rotation of the motor shaft 78 takes place. However if the aforementioned field and armature connections of the motor have been correctly assembled and the motor is rotating for example in the desired clockwise direction as indicated by the arrow 132 shown in FIGURE 3 the pin 38 will be rotated from one end of the slot 42 to the other. This slot 42 is formed by moving the cutter of a milling machine entirely through a portion of the ring surface 48 of the member 44.

When this pin 40 engages the end portion of the slot 42 it will then cause the disc 14 to be thereafter rotated in unison with the disc 12. The diameter of the pin 40 and the length of the slot 42 are of such dimensions that, when clockwise rotation of the motor shaft occurs after the switches 113a and 122 have been placed in their contact positions 118, 124, the starting rotation of the disc 12 will be such, before the pin 40 starts to drive the ring-shaped member portion 44 of the disc 14, that the centers of the small apertures 18 of disc 12 will be brought into complete alignment with the centers of the aperture 22 of disc 14 at the instant of time when the pin 40 hits the end of the slot 42.

When this alignment of the apertures 18 and 22 occurs the two discs are then allowed to function as stroboscopic discs and to allow pulses of light from the excitor lamp 130, of the two lamps, 130, 131, to sequentially pass through each pair of these aligned apertures 18, 22 onto a light responsive means, for example a photocell 133, as they are rotated by the motor ino the path of the light rays from lamp 130.

The photocell 133 in turn is supplied with suitable conductors 134, 136 which are connected to a light indicator that may be in the form of a tachometer 138.

If the light is passing through the apertures 18 and 22, the pointer 140 of the tachometer 138 will move from its twelve o'clock position 140 to a position identified by the reference numeral 142. This movement away from the twelve o'clock position which the pointer experiences acts as a means of informing an operator that the armature and field winding connections of the motor have been correctly assembled and that the motor is rotating in the desired clockwise direction when the switches 113a and 122 are in their respective solid line contact positions 118, 124.

If on the other hand the armature and field connections of the motor were not correctly assembled or in other words assembled so that the motor shaft 78 and the discs attached thereto rotate in a counter-clockwise direction or a direction that is opposite to that shown by the arrow 132 is FIGURE 1 then the apertures 18, 22 will remain out of alignment with one another when the pin 40 engages the end surface of the wall forming the slot 42 in the ring 44. In this position the light from the excitor lamp 130 which passes through the apertures 18 in disc 12 cannot be transmitted through their associated apertures 22 in the disc 14 to the phototube 133 when the motor shaft is rotated. It is thus evident under this condition that the pointer 140 of the tachometer will remain in its twelve o'clock position to indicate that no light is being received by the photocell 133 and that the armature and field windings of the motor under test have been incorrectly assembled.

If the switch 112 is then moved out of engagement with contact 118 and into engagement with contact 119 of the double throw single contact switch 113a the double throw single contact switch 122 will also be simultaneously moved out of its engaged position with contact 124 and into engagement with contact 125 by means of the mechanical link 120.

When the double throw single contact switches 113a, 122 are in this new contact position the motor will rotate in a counter-clockwise direction or a direction opposite to that shown by the arrow 132 in FIGURE 1 of the drawing if the motor armature and field connections have been properly assembled. When this counter-clockwise rotation occurs the motor shaft 78 will drive the rubber bushing and its associated parts 52, 70, 98, 104, 36, disc 12 and the pin 40 attached to the flange 36 in a counter-clockwise direction as a unitary member. Since the associated outer apertures 16 are initially displaced from their apertures 20 no light will be immediately permitted to pass through the second disc 14 before counter-clockwise rotation of the motor shaft 78 takes place. However a short instant of time after the correct counter-clockwise rotation takes place the pin 40 will be rotated from one of the ends of the slot to the opposite end of the slot which is shown in FIGURES 2 and 3 of the drawing.

When this pin 40 engages the end portion of the slot 42 it will cause the disc 14 to be thereafter rotated in unison with the disc 12 in a position in which the centers of the apertures 20 in the disc 14 are retained in alignment with their associated apertures 16 of the disc 12.

The discs 12 and 14 then act as stroboscopic discs by allowing pulses of light to be transmitted to the photocell 133 from the excitor lamp 131. The pulses of light sensed by this photocell 133 is in turn transmitted in the form of an electrical signal by way of the conductors 134, 136 to the tachometer 138 to indicate that pulsed light is being transmitted through the apertures 16, 20 and that the armature and field windings of the motor have been assembled correctly so as to cause it to rotate in a counter-clockwise direction.

When the electrical signal is received by the tachometer 138 it will cause the pointer to move away from its twelve o'clock position 140 to the position identified by reference 142.

If on the other hand the motor shaft is caused to rotate in a clockwise direction such as is indicated by the arrow 132 shown in FIGURE 1 of the drawing and the pin 40 is brought into contact with an opposite end portion of the slot the two discs 12 and 14 will continue to rotate in a position in which the solid portions of the discs between the apertures 20 will be in direct alignment with the apertures 16 in the disc 12. Since light from the excitor lamp 131 cannot under this condition be transmitted to the photocell 133 the pointer on the indicator will remain at its twelve o'clock position 140. Such an indication will inform the operator that is putting the motor 86 through a test that the motor shaft 78 is rotating in an opposite direction to that desired for the switch contact positions 119, 125 and that the armature and field windings of the motor have been improperly assembled.

From the aforementioned description of the apparatus it can be seen that a motor testing apparatus has been disclosed which will automatically indicate when the armature and field connections of a motor under test have been correctly or incorrectly assembled so as to cause the motor shaft to rotate in either a prescribed clockwise or counter-clockwise direction depending on whether a motor selector switch is in one or the other of two selected positions.

What is claimed is:

1. An apparatus to indicate when the shaft of an energized motor under test is being rotated in a desired clockwise direction or an undesired counter-clockwise direction in order to determine if the field connections of the motor have been correctly connected to produce said desired clockwise rotation of said shaft, comprising a first opaque disc fixedly connected to rotate with said motor, a second opaque disc, said first disc having a cylindrical member protruding from one side thereof and surrounding said shaft, said second disc having a ring portion fixedly connected to its central side wall portion and being in slidable contact with the outer surface of said cylindrical member, said ring portion having an arcuate slot formed in a side wall thereof, a driving pin connected at one end to said cylindrical member and protruding part way into said slot, a plurality of circumferentially spaced apart, axially aligned, apertures in the walls of said first and second discs, the centers of said apertures in the respective walls of said discs being spaced at equal radial distances from said motor shaft, said pin being operably moved by rotation of said motor to one end of said slotted wall to rotatably move said second disc into a position in which all of its apertures are moved out of alignment with the apertures in said first disc and into alignment with associated solid portions of the first disc while associated solid portions of the second disc are simultaneously brought into alignment with all of the apertures of the first disc under a condition in which said motor is energized in said undesired counter-clockwise direction, said pin being further operably moved by rotation of said motor to the other end of said slotted wall to thereby rotatably move said second disc into a position in which said apertures in said discs remain in alignment with one another, a lamp operably positioned with respect to the apertures in said walls to pass light through said aligned apertures, and a light responsive indicating means to indicate when light is passed through the aligned apertures in said discs thereby to indicate whether or not said field connections of said motor under test have been correctly connected.

2. An apparatus to indicate when the shaft of an energized motor under test is being rotated in a desired counter clockwise direction or an undesired clockwise direction in order to determine if the field connections of the motor have been correctly connected to produce said desired counter clockwise rotation of said shaft, comprising a first opaque disc fixedly connected to rotate with said motor, a second opaque disc, said first disc having a cylindrical member protruding from one side thereof and surrounding said shaft, said second disc having a ring portion fixedly connected to its central side wall portion and being in slidable contact with the outer surface of said cylindrical member, said ring portion having an arcuate slot formed in a side wall thereof, a driving pin connected at one end to said cylindrical member and protruding part way into said slot, a plurality of circumferentially spaced apart, axially aligned, through apertures formed in the walls of said first and second discs, the centers of said apertures formed in the respective walls of said discs being spaced at equal radial distances from said motor shaft, said pin being operably moved by rotation of said motor to one end of said slot to rotatably move said second disc into a position in which all of its apertures are moved out of alignment with the apertures in said first disc and into alignment with associated solid portions of the first disc while associated solid portions of the second disc are simultaneously brought into alignment with all of the apertures of the first disc under a condition in which said motor is energized in said undesired clockwise direction, said pin being further operably moved by rotation of said motor to the other end of said slot to thereby rotatably move said second disc into a position in which said apertures in said discs remain in alignment with one another, a lamp operably positioned with respect to the apertures in said walls to pass light through said aligned apertures, and a light responsive indicating means to indicate when light is passed through the aligned apertures in said discs thereby to indicate whether or not said field connections of said motor under test have been correctly connected.

3. An apparatus to indicate when the shaft of an energized motor under test is being rotated in a desired clockwise direction or an undesired counter clockwise direction in order to determine if the field connections of the motor have been correctly connected to produce said desired clockwise rotation of said shaft, comprising a first opaque member fixedly connected to rotate with said motor, a second opaque member, said first member having a cylindrical portion thereof protruding from one side thereof and surrounding said shaft, said second member having a ring portion fixedly connected to its central side wall portion and being in slidable contact with the outer surface of said cylindrical portion, said ring portion having an arcuate slot formed in a side wall thereof, a driving pin connected at one end to said cylindrical portion and protruding part way into said slot, a plurality of circumferentially spaced apart, axially aligned, through apertures formed in the wall of said first and second members, the centers of said apertures formed in the respective walls of said members being spaced at equal radial distances from said motor shaft, said pin being operably moved by rotation of said motor to one end of said slot to rotatably move said second member into a position in which all of its apertures are moved out of alignment with the apertures in said first member and into alignment with associated solid portions of the first member while associated solid portions of the second member are simultaneously brought into alignment with all of the apertures of the first member under a condition in which said motor is energized in said undesired counter clockwise direction, said pin being further operably moved by rotation of said motor to the other end of said slot to thereby rotatably move said second member into a position in which said apertures in said members remain in alignment with one another, an exciter light positioned to pass light through said aligned apertures and a light responsive indicating means to indicate when light is passed through or not passed through said apertures in said members to thereby indicate whether or not said field connections of said motor under test have been correctly or incorrectly connected.

4. An apparatus to indicate when the shaft of an energized motor under test is being rotated in a desired clockwise direction or an undesired counterclockwise direction in order to determine if the field connections of the motor have been correctly connected to produce said desired clockwise rotation of said shaft, comprising a first opaque stroboscopic disc fixedly connected to rotate with said motor, a second opaque stroboscopic disc, said first stroboscopic disc having a cylindrical member protruding from one side thereof and surrounding said shaft, said second stroboscopic disc having a ring portion fixedly connected to its central side wall portion and being in slidable contact with the outer surface of said cylindrical member, said ring portion having an arcuate slot formed in a side wall thereof, a driving pin connected at one end to said cylindrical member and protruding part way into said slot, a plurality of circumferentially spaced apart, axially aligned, through apertures formed in the wall of said first and second stroboscopic discs, the centers of said apertures formed in the respective walls of said stroboscopic discs being spaced at equal radial distances from said motor shaft, said pin being operably moved by rotation of said motor to one end of said slot to rotatably move said second stroboscopic disc into a position in which all of its apertures are moved out of alignment with the apertures in said first stroboscopic disc and into alignment with associated solid portions of the first disc while associated solid portions of the second disc are simultaneously brought into alignment with all of the apertures of the first disc under a condition in which said motor is energized in said undesired counter clockwise direction, said pin being further operably moved by rotation of said motor to the other end of said slot to thereby rotatably move said second stroboscopic disc into a position in which said apertures in said stroboscopic discs remain in alignment with one another, an exciter light positioned to pass light through said aligned apertures and a stroboscopic light responsive indicating means to indicate when light is passed through or not passed through said apertures in said stroboscopic discs to thereby indicate whether or not said field connections of said motor under test have been correctly or incorrectly connected.

5. An apparatus to indicate when the shaft of an energized motor under test is being rotated in a desired clockwise direction or an undesired counter clockwise direction in order to determine if the motor has been correctly wired to produce said desired clockwise rotation of said shaft, comprising a first opaque disc fixedly connected to rotate with said motor, a second opaque disc, said first disc having a hub portion, said second disc having a ring portion fixedly connected to its central side wall portion and being in slidable contact with the outer surface of said hub portion, said ring portion having an arcuate slot formed in a side wall thereof, a driving pin connected at one end to said hub portion and protruding part way into said slot, a plurality of circumferentially spaced apart, axially aligned, through apertures formed in the walls of said first and second discs, the centers of said apertures formed in the respective walls of said discs being spaced at equal radial distances from the longitudinal centerline of said motor shaft, said pin being operably moved by rotation of said motor to one end of said slot to rotatably move said second disc into a position in which all of its apertures are moved out of alignment with the apertures in said first disc and into alignment with associated solid portions of the first disc while associated solid portions of the second disc are simultaneously brought into alignment with all of the apertures of the first disc under a condition which said motor is energized in said undesired counter clockwise direction, said pin being further operably moved by rotation of said motor to the other end of said slot to rotatably move said second disc into a position in which said apertures in said discs remain in alignment with one another, an exciter light positioned to pass light through said aligned apertures and a light responsive indicating means to indicate when light is passed through or not passed through said apertures in said discs to thereby indicate whether or not said motor under test has been correctly or incorrectly wired.

6. An apparatus for indicating whether a shaft of an energized electric motor under test is being rotated in a desired clockwise or an undesired counter clockwise direction in order to determine if the field connections of the motor have been correctly connected to produce said desired clockwise rotation or incorrectly connected to produce said undesired counter clockwise rotation, comprising a first disc, a spring retaining plate to fixedly mount said disc to the outer end of said motor shaft, said first disc having a collar integral therewith and protruding inwardly from the side of said disc toward said motor, a second disc, said second disc having an annular ring member integral therewith, said ring member being loosely mounted for movement on the outer surface of said collar, an arcuate slot formed in said side wall of the annular ring member that is adjacent said motor, said collar having a flange spaced from and covering said slot, a pin of a smaller diametral dimension than the width of said slot fixedly connected to an inner side wall of said flange adjacent said slot at one end and said pin being of a length to protrude part way into the slot at its other end, each of said discs having a plurality of equally spaced apart axially alligned through apertures of the same diametral dimension formed therein, the wall portions of said discs defining said apertures being normal to the side portions of said discs, the centers of each pair of said aligned apertures formed by the respective wall portions of said discs being spaced at equal radial distances from said motor shaft, a first exciting lamp, a power source, a double throw switch, electrical connections between said power source and said switch, said switch being operably connected to supply power to said field windings and to said exciting lamp to rotate said motor and to light said exciting lamp when said switch is in a selected operating position, a photocell positioned adjacent said motor and the side wall of said second disc to sense light passing through said aligned apertures in said discs when said switch is in said selected operating position, the arcuate length of said slot formed by said ring member being of a dimension to accommodate the movement of said pin into driving contact with the wall portion forming one end thereof during a condition in which said field connections have been correctly connected, the motor is being driven in said desired clockwise direction and said apertures in said discs are axially aligned with one another and light from said exciter lamp passing through said apertures is being sensed by said photocell; the wall portion forming the other end of the slot in said annular ring member being spaced from said first end of the slot to accommodate the movement of said pin into contact with the wall portion at the other end of said slot under a condition in which the field connections have been incorrectly connected, the switch is in said selected operating position, said motor is being driven in an undesired counter clockwise direction and all of said apertures in said first disc are aligned with opaqe wall portions of said second disc which lie between the apertures of said second disc, while all of the apertures in the second disc are aligned with apaque wall portions of the first disc which lie between the apertures of the first disc and light from said exciter lamp is thereby prevented from being transmitted through said second disc to said photocell, and light responsive indicating means operably connected to said photocell to indicate when light is passed through or not passed through associated apertures in said discs to thereby indicate whether or not said field connections of said motor under test have been correctly or incorrectly connected.

7. An apparatus for indicating whether a shaft of an energized electric motor under test is being rotated in a desired counter clockwise or an undesired clockwise direction in order to determine if the field connections of the motor have been correctly connected to produce said desired counter clockwise rotation or incorrectly connected to produce said undesired clockwise rotation, comprising a first disc, a spring retaining plate to fixedly mount said disc to the outer end of said motor shaft, said first disc having a collar integral therewith and protruding inwardly from the side of said disc toward said motor, a second disc, said second disc having an annular ring member integral therewith, said ring member being loosely mounted for movement on the outer surface of said collar, an arcuate slot formed in said side wall of the annular ring member that is adjacent said motor, said collar having a flange spaced from and covering said slot, a pin of a smaller diametrial dimension than the width of said slot fixedly connected to an inner side wall of said flange adjacent said slot at one end and said pin being of a length to protrude part way into the slot at its other end, each of said discs having a plurality of equally spaced apart axially aligned through apertures of the same diametral dimension formed therein, the wall portions defining said apertures being normal to the side portions of said discs, the centers of each pair of said aligned apertures formed by the respective wall portions of said discs being spaced at equal radial distances from said motor shaft, a first exciting lamp, a power source, a double throw switch, electrical connections between said power source and said switch, said switch being operably connected to supply power to said field windings and to said exciting lamp to rotate said motor and to light said exciting lamp when said switch is in a selected operating position, a photocell positioned adjacent said motor and the side wall of said second disc to sense light passage through said aligned apertures in said discs when said switch is in said selected operating position, the arcuate length of said slot formed by said ring member being of a dimension to accommodate the movement of said pin into driving contact with the wall portion forming one end thereof during a condition in which said field connections have been correctly connected, the motor is being driven in said desired counter clockwise direction and said apertures in said discs are axially aligned with one another and light from said exciter lamp passing through said apertures is being sensed by said photocell; the wall portion forming the other end of the slot in said annular ring member being spaced from said first end of the slot to accommodate the movement of said pin into contact with the wall portion at the other end of said slot under a condition in which the field connections have been incorrectly connected, the switch is in said selected operating position said motor is being driven in an undesired clockwise direction and all of said apertures in said first disc are aligned with opaque wall portions of said second disc which lie between the apertures of said second disc, while all of the apertures in the second disc are aligned with opaque wall portions of the first disc which lie between the apertures of the first disc and light from said exciter lamp is thereby prevented from being transmitted through said second disc to said photocell, and light responsive indicating means operably connected to said photocell to indicate when light is passed through and not passed through associated apertures in said discs to thereby indicate whether or not said field connections of said motor under test have been correctly or incorrectly connected.

8. An apparatus for indicating whether a shaft of an energized electric motor under test is being rotated in a first desired clockwise direction, a second desired counter clockwise direction, a first undesired counter clockwise direction and a second undesired clockwise direction in order to determine if the field connections of the motor have been correctly connected to produce said desired clockwise or counter-clockwise rotation or incorrectly connected to produce said undesired opposite counter clockwise rotations, comprising a first disc, a spring retaining plate to fixedly mount said disc to the outer end of said motor shaft, said first disc having a collar integral therewith and protruding inwardly from the side of said disc toward said motor, a second disc, said second disc having an annular ring member integral therewith, said ring member being loosely mounted for movement on the outer surface of said collar, an arcuate slot formed in said side wall of the annular ring member that is adjacent said motor, said collar having a flange spaced from and covering said slot, a pin of a smaller diametrial dimension than the width of said slot fixedly connected to an inner side wall of said flange adjacent said slot at one end and said pin being of a length to protrude part way into the slot at its other end, each of said discs having a first and second series of axially aligned apertures formed therein, said first series of apertures being of a different diametral dimension than the second series of apertures, the wall portions defining said apertures being normal to the side portions of said discs, the centers of said first series of aligned apertures formed by the respective wall portions of said discs being spaced at different radial distances from the axis of said motor shaft that the second series of apertures, a first and second exciting lamp, a power source, a double throw switch, electrical connections between said power source and said switch, said switch being operably connected to supply power to said field windings to rotate said motor and to light said first exciting lamp when said switch is in a first selected operating position and to rotate said motor and to light said second exciting lamp when the switch is in a second selected position, a photocell positioned adjacent said motor to sense light passing through a selected pair of said first aligned series of apertures in said discs when said switch is in said first selected operating position, the arcuate length of said slot formed by said ring member being of a dimension to accommodate the movement of said pin into driving contact with the wall portion forming one end thereof during a condition in which said field connections have been correctly connected, the motor is being driven in said first desired clockwise direction and said first series of apertures in said discs are axially aligned with one another and light from said first exciter lamp passing through said apertures is being sensed by said photocell; the wall portion forming the other end of the slot in said annular ring member being spaced from said first end of the slot to accommodate the movement of said pin into contact with the wall portion at the other end of said slot under a condition in which the field connections have been incorrectly connected, the switch is in said first selected operating portion, said motor is being driven in said first undesired counter clockwise direction and all of said apertures in said first disc series are aligned with opaque wall portions of said second disc which lie between the first series apertures of said second disc while all of the apertures of the first series in the second disc are aligned with opaque wall portions of the first disc that lie between the first series of apertures in the first disc, and light from said first exciter lamp is thereby prevented from being transmitted through said second disc to said photocell, said photocell being further operative to sense light emitted by said second exciter lamp passing through said second series of apertures in said discs when said switch is in a second selected operating position and in a condition in which said field connections have been correctly connected, said motor is being driven in said second desired counter clockwise direction, said pin is in driving contact with said other end of said slot, said second series of apertures in said discs are axially aligned with one another and light from said second exciter lamp is being sensed by said photocell, said light emitted by said second exciter lamp being cut off by said second disc in a condition in which said field connections have been incorrectly connected, said motor is being driven in said second undesired counter clockwise direction, said pin is in driving contact with said one end of said slot, all of said second series of apertures in said first disc are aligned with opaque wall portions of said second disc while all of the second series apertures in the second disc are aligned with opaque wall portions of the first disc and light from said second exciter lamp is thereby prevented from being transmitted through said second disc to said photocell, and light responsive indicating means operably connected to said photocell to indicate when light is passed through or not passed through associated apertures in said discs to thereby indicate whether or not said field connections of said motor under said clockwise and counter-clockwise tests have been correctly or incorrectly connected.

9. A testing apparatus to indicate when the field connections of an electric motor have been incorrectly assembled and when the shaft of said motor is rotating in an undesired counter-clockwise direction, comprising a first disc fixedly connected to rotate with said motor shaft, a second disc, a pin and arcuate slot driving connection between said discs to provide a partial angular displacement between said first and second discs, each of said discs having a plurality of identical circumferentially spaced-apart aligned apertures of substantially equal diameter all of which are equally displaced from the central longitudinal axis of said motor shaft, said pin of said pin and slot connection being operably connected to align solid portions of the first disc with each of the apertures in the second disc and to simultaneously align solid portions of the second disc with each of the apertures in said first disc when said shaft of said motor is energized in said undesired counter-clockwise direction, a stationary source of light positioned adjacent and normal to the path followed by said apertures upon rotation of said discs, a light responsive indicating means, one of said discs being operable by means of said connection to move into the unaligned apertured position and thereby prevent light from said light source from passing through any of the apertures to said light responsive means, and the light responsive indicating means being operably connected to simultaneously indicate that the apertures in the discs are in their unaligned, no-light transmitting position and that the field connections of said motor have been incorrectly assembled.

10. A testing apparatus to indicate when field connections of an electric motor have been correctly assembled and when the shaft of said motor is rotating in a desired clockwise direction, comprising a first disc fixedly connected for rotation with said motor shaft, a second disc, a pin and arcuate slot driving connection between said discs to provide a partial angular displacement between said first and second discs, each of said discs having a plurality of identical circumferentially spaced-apart apertures substantially equally displaced from the central longitudinal axis of said motor shaft, said pin of said pin and slot connection being operable to rotate the second disc and all of said spaced-apart apertures therein to a position wherein said last-mentioned apertures are brought into alignment with their associated spaced-apart apertures in said first disc when said shaft of said motor is energized in said desired clockwise direction, a source of light, a light responsive indicating means, and said discs being positioned with respect to said light source to allow light from said light source to pass through said apertures to said light responsive indicating means when said apertures of said discs are in their aligned position and thereby indicate on the light responsive indicating means that the field connections of the motor have been correctly assembled.

11. A stroboscopic apparatus adapted to be mounted for rotation on the shaft of an electric motor to determine if the motor has been wired correctly to enable it to be rotated in a desired clockwise or counter-clockwise direction, comprising two stroboscopic discs having identical circumferentially arranged apertures therein, one of the discs having a driving pin fixedly connected to and protruding from a surface thereof that is adjacent a flat surface of the other disc, a slot formed in the last-mentioned surface into a portion of which the outer end of said pin is adapted to protrude, a light source, a power source, an electrical switching circuit connecting the power source to the motor and light source and being operably connected to energize the motor and light the light source, said light source being positioned adjacent the circumferential path of said apertures in one of the discs, light responsive means adjacent the circumferential paths of the apertures in the other of the discs, the pin and slot connection forming a driving connection between said two discs being operably connected to align all of the apertures in said discs and allow light from the light source to pass through the apertures in the discs to said light responsive means only when the pin is rotatably engaged with an end of the slot and said motor has been correctly wired and energized to rotate in either a clockwise or counter-clockwise direction.

12. A stroboscopic apparatus adapted to be mounted for rotation on the shaft of an electric motor to determine if the motor has been wired correctly, comprising two stroboscopic discs having identical apertures therein arranged circumferentially over at least a portion of said discs, one of said two discs having a driving pin fixedly connected to and protruding from a surface thereof that is adjacent a flat surface of the other disc, the other of said discs having a slot formed in the last-mentioned surface into a portion of which the outer end of the pin protrudes, a light source, a power source, and an electrical switching circuit connecting the power source to the motor and the light source and being operably connected to energize the motor and light the light source, the light source being positioned adjacent the circumferential path of said apertures in one of said discs, light responsive means adjacent the circumferential path of the apertures in the other of said discs, said pin and slot connection forming a driving connection between said two discs to align the apertures in said discs and to allow light from said light source to pass through the apertures in said discs to said light responsive means only when the pin engages an end of the slot and said motor has been wired correctly.

13. A testing apparatus to indicate when the field connections of an electric motor have been correctly assembled and when the shaft of said motor is rotating in a desired clockwise direction, comprising a first disc fixedly connected for rotation with said motor shaft, a second disc, a pin and arcuate slot driving connection to provide a partial angular displacement between said first and second discs, each of said discs having a plurality of identical circumferentially spaced-apart apertures substantially equally displaced from the center longitudinal axis of said motor shaft, said pin of said pin and slot connection being operable to rotate the second disc and all of the spaced-apart apertures therein to a position wherein said last-mentioned apertures are brought into alignment with their associated spaced-apart apertures in said first disc when said shaft of said motor is energized in said desired clockwise direction, a source of light, a light responsive means, a light indicator operably connected to the light responsive means, said discs being positioned with respect to said light source to allow light from said light source to pass through said apertures to said light responsive means when said apertures of said discs are in their aligned position and thereby indicate on the light indicator that the field connections of the motor have been correctly assembled.

References Cited in the file of this patent

UNITED STATES PATENTS

| | | |
|---|---|---|
| 2,509,743 | Olinger | May 30, 1950 |
| 2,788,519 | Caldwell | Apr. 9, 1957 |
| 2,933,009 | Vlahos | Apr. 19, 1960 |
| 3,005,380 | Harrison et al. | Oct. 24, 1961 |

OTHER REFERENCES

German application class G 02 d, 1,016,464, Sept. 26, 1957.